April 3, 1934.   M. HURST   1,953,759
FILTER FOR LIQUIDS
Filed Jan. 26, 1932   2 Sheets-Sheet 1

April 3, 1934.　　　M. HURST　　　1,953,759

FILTER FOR LIQUIDS

Filed Jan. 26, 1932　　　2 Sheets-Sheet 2

Inventor
Max Hurst
by Steward & McKay
his attorneys

Patented Apr. 3, 1934

1,953,759

UNITED STATES PATENT OFFICE 1,953,759

FILTER FOR LIQUIDS

Max Hurst, Stuttgart, Germany, assignor to Robert Bosch Aktiengesellschaft, Stuttgart, Germany Application January 26, 1932, Serial No. 589,015
In Germany January 29, 1931

8 Claims. (Cl. 210—165)

The present invention relates to a filter for liquids, more especially fuels, which consists of cylindrical filter sleeves inserted concentrically into one another and pervious to liquid over their entire area. The novelty of such a filter consists essentially, according to the invention, in that the filter insertion which the liquid first encounters is a metallic coarse sieve, and the last filter insertion is a stretched fine filter having a suitable fabric which retains the finer particles of dirt. As compared with known filters, the filter according to the present invention has the advantages more especially of simplicity of manufacture, cheapness, and reliability in operation, as well as of the ease and rapidity with which the filter insertions can be cleaned.

An example of construction of the invention is illustrated in the accompanying drawings, in which:—

Figure 3:
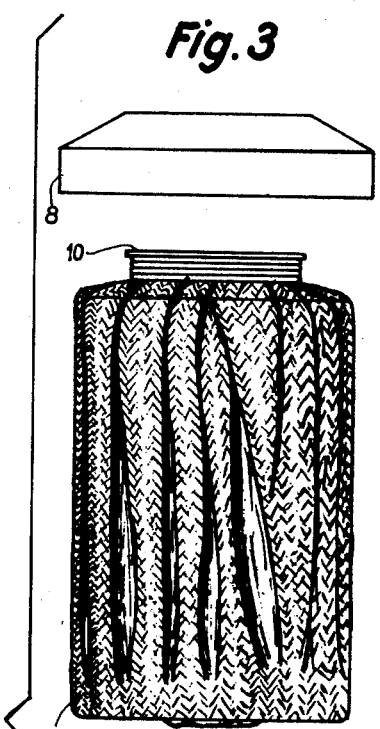

Figure 3 presents a disassembled view of the various parts showing the coarse and fine filters separated from each other.

Figure 1:
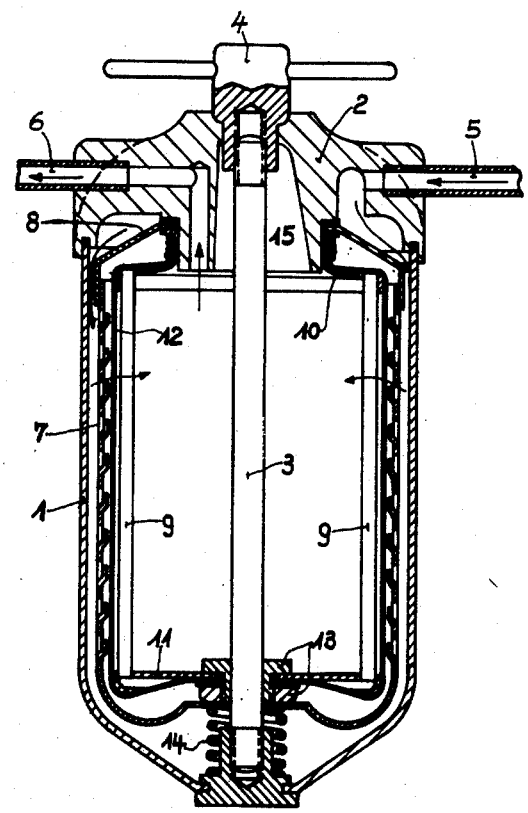
Figure 1 is a longitudinal section through the filter.
Figure 2:
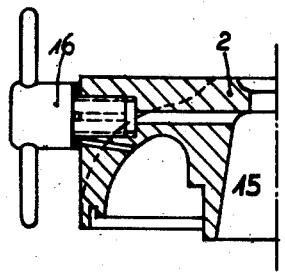
Figure 2 is a radial section through the cover of the filter in a vertical plane transverse to the plane of the section of Fig. 1.
Figure 4:
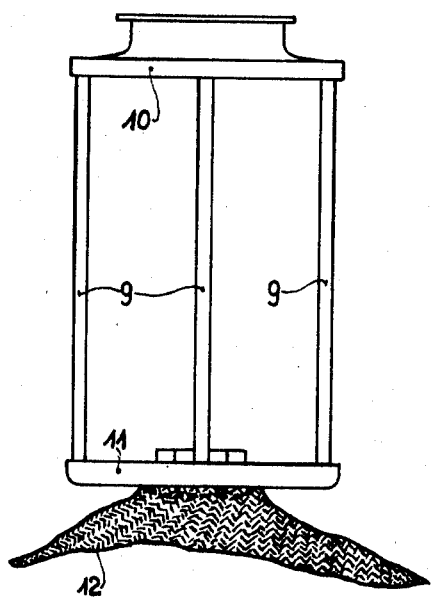

Figure 4 is an elevation of the fine filter alone, with the filtering fabric not yet firmly attached.

Figure 5:
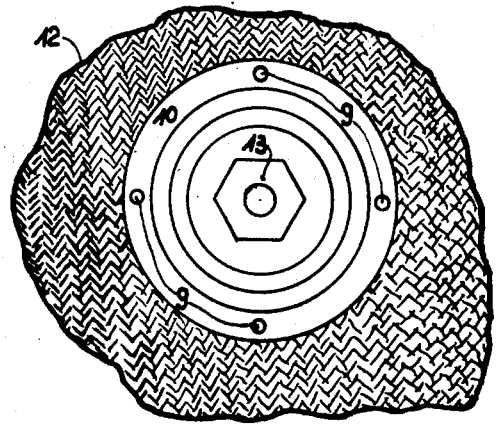
Figure 5:
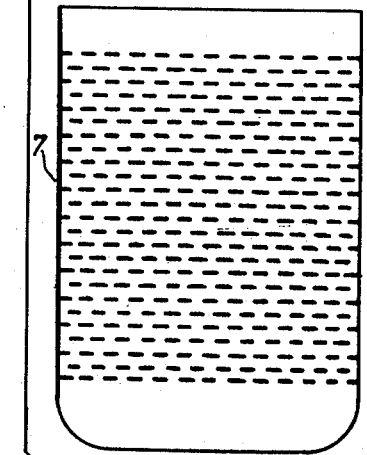

Figure 5 is a plan view of the fine filter in this condition.

The filter is enclosed in a cylindrical casing 1, the cover 2 of which is tightened in relation to the casing by a stay-bolt 3 screwed to the casing bottom and a tommy-screw 4 mounted in the cover 2. The liquid to be purified enters into the closed container so formed through a pipe 5 and passes out through the outlet pipe 6. The coarse filter is placed over the stay-bolt 3, and consists of a sheet metal box 7, having an easily removable cover 8 placed thereon. The wall of the box is perforated over its whole extent by pressing out small pockets; the cover has a large central opening into which an annular extension on the cover 2 projects.

Concentrically in the perforated sheet metal box 7 is mounted a fabric filter. The supporting frame for the fabric is formed by a cage, consisting of a bottom-plate 11, rods 9 and a jar neck shaped cover-plate 10. It is covered over with a woven fabric 12 of suitable material, which is cut in the form of a circular disc and is applied in the following manner. The perforated centre of the disc is firmly secured by a screw 13 in the middle of the bottom-plate 11 of the cage. Then the periphery of the disc of fabric is raised up, whereby it forms into pleats or folds which begin at the bottom and constantly increase in width upwards (see Figure 3); finally, this bundle of pleats and the bottle-neck shaped middle of the cover-plate 10 of the cage are connected together by a string wrapping, and the whole piece placed in the sheet metal box 7 and the lid 8 placed upon it. The annular prolongation of the cover 2 of the casing also projects into the bottle-neck of the cover-plate 10. Between the bottom of the sheet metal box 7 and the bottom of the casing 1 a spiral spring 14 is disposed around the stay-bolt 3, which spring tightens the sheet metal casing 7, 8 against the cover 2.

The central annular extension of the cover 2 encloses a chamber 15, into which opens at its uppermost point a cross-passage which is closed by a tommy screw 16. The screw in its threaded part is bored centrally longitudinally up to the head, and with this longitudinal bore a transverse hole connects to atmosphere below the head of the screw, the arrangement being such that the atmospheric connection may be opened or closed by the screw.

The filter so formed is traversed by the liquid to be purified in the direction of the arrows shown in the drawing. The coarser impurities are retained on the outer side of the perforations in the sheet metal box 7, so that this acts as a coarse filter. The particles separated out sink down between the wall of the sheet metal box 7 and the wall of the casing 1, and collect in the bottom of the casing 1.

The finer impurities not retained by the sheet metal box 7 are intercepted by the fabric 12, which accordingly acts as a fine filter, and sink downwards between the outer side of the fabric and the inner side of the wall of the box 7, where they can collect at the bottom of the coarse filter 7.

The air which is separated inside the filter can collect in the chamber 15 in the cover 2 and can escape therefrom through the passages in the tommy-screw 16 when this is screwed back a few threads.

As can easily be seen, the whole filter can be easily and conveniently taken apart and again assembled, because the screwed connection of the stay-bolt with the tommy-nut 4 forms the sole connection of all the parts. After the slackening of this connection, the casing 1 together with the coarse and fine filters can be removed; then the coarse filter can be removed from the casing, and from the coarse filter the fine filter can be removed after taking off the cover 8 from the box 7.

The coarse impurities which have deposited in the bottom of the casing 1 and the fine impurities deposited in the bottom of the box 7 can then be easily washed out. Also the fine particles still adhering in the pores of the filter fabric 12 can be flushed away easily and very thoroughly by a jet of water directed into the neck-opening of the fine filter, because this jet flows in the reverse direction to the current of the liquid to be filtered, and presses out the particles wedged in the pores of the fabric.

The fabric can be easily replaced, after slackening the screw 13 and the string connection on the neck of the cover-plate 10; the only tools necessary for this are a spanner and some string.

Finally, a filter of the present construction may be used without any constructional alteration either as a coarse filter only, by removing the fine filter, or only as a fine filter by removing the coarse filter; in the second case the fine filter is pressed by the spring 14 against the cover 2.

I declare that what I claim is:

1. A liquid filter comprising a casing, a cover for said casing, a cylindrical projection on the under side of said cover, a cylindrical metal coarse filter element, a fabric fine filter element concentrically arranged with said coarse filter element, a neck band for said fine filter element engaging about said cylindrical projection, and a centrally apertured metal cap on said coarse filter element engaging over said neck band.

2. A liquid filter comprising a casing, a cover for said casing, a hollow cylindrical projection on the under side of said cover forming a collecting space for air separated from the liquid in the filter, a conduit to atmosphere from said hollow cylindrical projection, means to close said conduit, a cylindrical metal coarse filter element pervious to liquid over its whole extent and a cylindrical fabric fine filter element concentrically arranged with relation to said metal filter element.

3. A liquid filter comprising a casing, a cover for said casing, a cylindrical projection on the under side of said cover, a cylindrical metal coarse filter element, a fabric fine filter element concentrically arranged with said coarse filter element, a cap on said coarse filter element engaging against the under side of said cover and about said cylindrical projection, a neck band for said fine filter element engaging against the under surface of said cap and about said cylindrical projection and a bolt passing through said cover and the bottom of the two filter elements and engaging in a thread in the bottom of said casing to secure the cover to the casing and to centralize the two filter elements.

4. A liquid filter comprising a casing, a cover for said casing, a cylindrical projection on the under side of said cover, a sheet metal pot having perforated sides presenting a cylindrical metal coarse filter element, a fabric fine filter element concentrically arranged within said coarse filter element and having a rigid support mounted on the bottom of said pot, a cap on said coarse filter element engaging against the under side of said cover and about said cylindrical projection, a neck band for said fine filter element engaging the under surface of said cap and about said cylindrical projection, a bolt passing through said cover and the bottom of said pot and engaging in a thread in the bottom of said casing to secure the cover to the casing and to centralize the two filter elements and a spring arranged about the end of the said bolt engaging the bottom of the casing and the bottom of said pot to press the two filter elements in common against said cover.

5. A liquid filter comprising the combination with a cylindrical metal coarse filter element, of a fine filter element comprising a circular metal plate, a metal collar, rods connecting said plate and said collar to form an open cylindrical framework and a disc of fabric secured at its centre to said plate, pleated to form a cylindrical wall and secured at its periphery to said collar to form a fabric fine filter element accommodated within said metal coarse filter element.

6. A liquid filter comprising a casing, a sheet metal pot disposed upright and spaced inwardly of said casing, said pot having coarse filtering openings formed by pocket-like flaps pressed from its vertical wall inwardly of the pot in a manner to dispose the free ends of the flaps upwardly, a fabric fine filter element concentrically arranged within said pot, and means for admitting liquid to be filtered to said casing at a point causing a flow of said liquid against the outer wall of said pot.

7. A liquid filter comprising a casing, a cover for said casing provided with a centrally disposed cylindrical projection on its under side, a self-sustaining rigid metal coarse filter element within said casing, a non-rigid fabric fine filter element concentrically arranged within said coarse filter element, a cage support for the fine filter element, a rigid neck band for said fine filter element mounted on said cage support and engaging about said cylindrical projection and a rigid centrally apertured metal cap on said coarse filter element engaging against said neck band and said cylindrical projection, whereby said filter elements are secured against lateral movements in said casing and with respect to each other.

8. A liquid filter comprising a casing, a cylindrical sheet metal coarse filter element vertically disposed in said casing and spaced from the side walls thereof, means admitting the liquid to be filtered to said casing for initial flow against one face of said filter element, said filter element having filtering apertures formed by pocket-like flaps pressed from its cylindrical sheet metal wall to form said flaps with curved bases and their remaining portions from their said curved bases to their free ends extending vertically all in one direction whereby the flaps present surfaces facilitating precipitation of material thereon from said liquid as it flows against said filter element and through said apertures and the movement of precipitated material from flap to flap downwardly of said filter element.

MAX HURST.